United States Patent
Chen et al.

(10) Patent No.: US 9,420,306 B2
(45) Date of Patent: Aug. 16, 2016

(54) ESTIMATING METHOD OF PREDICTED MOTION VECTOR

(75) Inventors: Tsui-Chin Chen, Hsinchu (TW); Yu-Shu Liu, Hsinchu (TW); Wan-Hsi Hsieh, Taoyuan County (TW); Yu-Tsung Hu, Changhua County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 560 days.

(21) Appl. No.: 13/345,758

(22) Filed: Jan. 9, 2012

(65) Prior Publication Data

US 2013/0051473 A1     Feb. 28, 2013

(30) Foreign Application Priority Data

Aug. 26, 2011   (TW) .............................. 100130718 A

(51) Int. Cl.
*H04N 19/00*    (2014.01)
*H04N 19/533*   (2014.01)

(52) U.S. Cl.
CPC ................................... *H04N 19/533* (2014.11)

(58) Field of Classification Search
CPC ...... H04N 7/50; H04N 7/26244; H04N 5/145
USPC ....................................................... 375/240.16
See application file for complete search history.

(56) References Cited

U.S. PATENT DOCUMENTS

| 4,750,642 | A | 6/1988 | Eckstein |
| 6,430,303 | B1* | 8/2002 | Naoi et al. ............. 382/104 |
| 7,224,731 | B2 | 5/2007 | Mehrotra |
| 7,616,692 | B2 | 11/2009 | Holcomb |
| 2009/0309966 | A1* | 12/2009 | Chen et al. ............. 348/135 |

FOREIGN PATENT DOCUMENTS

| TW | 201001338 | 1/2010 |
| TW | 201031213 | 8/2010 |
| WO | 03098922 A1 | 11/2003 |

* cited by examiner

*Primary Examiner* — Jay Patel
*Assistant Examiner* — Frank Huang
(74) *Attorney, Agent, or Firm* — Winston Hsu; Scott Margo

(57) ABSTRACT

An estimation method of a predicted motion vector for an image block having one or more pixels, which includes calculating a pixel difference value corresponding to a current frame and a reference frame for each pixel of the image block, determining a pixel difference area according to the pixel difference values corresponding to the plurality of pixels, and determining a predicted motion vector according to the pixel difference area.

8 Claims, 6 Drawing Sheets

ESTIMATING METHOD OF PREDICTED MOTION VECTOR

BACKGROUND OF THE INVENTION

1. Field of the Invention

The present invention relates to an estimation method for a predicted motion vector, and more particularly, to an estimation method for estimating a predicted motion vector via difference information between frames.

2. Description of the Prior Art

Motion estimation is an important technique in video compression, its objective being to determine a motion vector using a correlation between a previous and subsequent frame, and to obtain the subsequent image frame accordingly, thereby reducing redundancy information in each image frame at different times. A video is a series of image frames played back consecutively, and its primary working principle is to create an illusion of animation via transient visual persistence of the subtle variations between neighboring image frames. Generally, neighboring frames exhibit a strong correlation with each other in time and space, and usually have portions that are similar or identical to each. Therefore, when storing or transmitting image frames, the identical parts without variation do not need to be stored. After recording previous frames, a subsequent frame may be reconstructed using the stored previous frame and information recorded during the object motion process. In other words, during video encoding/decoding, not all of the frame information needs to be processed, thereby effectively reducing transmission throughput, and achieving video compression.

Block matching is a common method for calculating a motion vector, in which an image frame is divided into multiple non-overlapping blocks, and similar portions in each block at different times are identified to obtain the motion vector information for each block. Various search algorithms have been proposed in the prior art for determining correlation information of motion vectors. For example, algorithms such as Full Search, Three Step Search, Four Step Search, Diamond Search, Three Dimensional Recursive Search, or Cross Search may be used to obtain correlation information for a motion vector, and then the predicted motion vector may be obtained via match estimation (e.g. sum of absolute difference (SAD) computation) to implement optimal block matching. However, despite the ability to provide more accurate motion vectors, block matching methods incur longer search time and more complex computations, and thus do not suit real-time applications.

In such a case, phase plane correlation has been proposed in the prior art to implement faster motion vector estimation, which primarily converts the video image from spatial domain to frequency domain, and directly compare phase differences of two image frames in the frequency domain to perform motion vector estimation. However, phase plane correlation methods require performing Fast Fourier Transform (FFT) for conversion, which also consumes excessive system resources and computation time, and thus they are not suit for real-time applications.

SUMMARY OF THE INVENTION

A method is provided in the disclosure for simply and rapidly estimating predicted motion vector via difference information between frames.

In one aspect, an estimation method of a predicted motion vector for an image block having one or more pixels is disclosed. The estimation method comprises calculating a pixel difference value corresponding to a current frame and a reference frame for each pixel of the image block; determining a pixel difference area according to the pixel difference values corresponding to the plurality of pixels; and determining a predicted motion vector according to the pixel difference area.

In another aspect, an estimation method of a predicted motion vector for an image block having one or more pixels is also provided. The estimation method comprises detecting a current pixel value corresponding to a current frame and a reference pixel value corresponding to a reference frame for each pixel of the image block, and calculating a difference value between the current pixel value and the reference pixel value as the pixel difference value, comparing the pixel difference value of each pixel with a variation threshold value to generate a comparison result, and selecting pixels having pixel difference values greater than the variation threshold value to form the pixel difference area according to the comparison result, and determining a predicted motion vector according to the pixel difference area.

In further another aspect, an estimation method of a predicted motion vector for an image block having one or more pixels is also provided. The estimation method comprises calculating a pixel difference value corresponding to a current frame and a reference frame for each pixel of the image block, determining a pixel difference area according to the pixel difference values corresponding to the plurality of pixels, and determining one or more components of a predicted motion vector according to one or more length of the pixel difference area along one or more corresponding directions.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
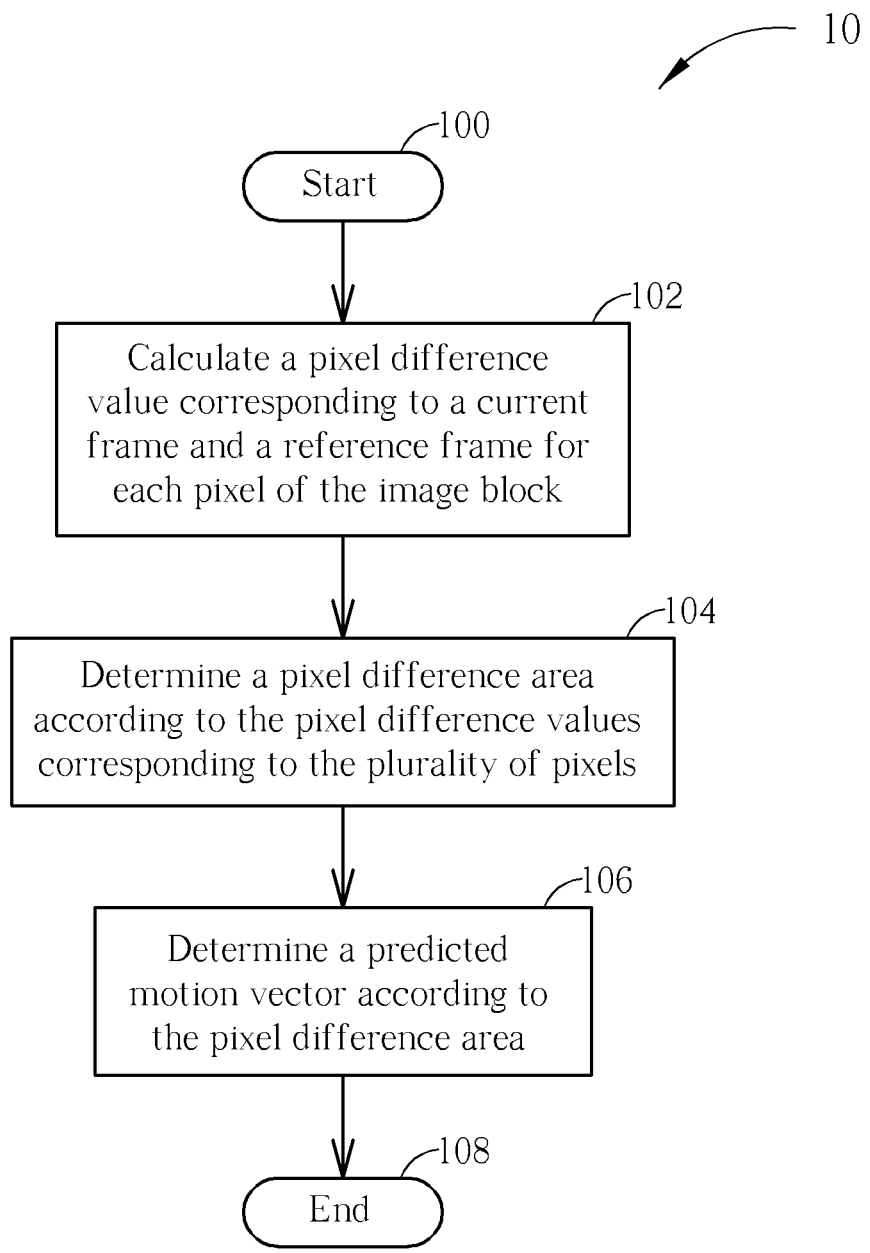
FIG. 1 is a schematic diagram of a process according to an embodiment of the invention.

Please refer to FIG. 1, which is a schematic diagram of a process 10 according to an embodiment of the invention. For illustration purposes, assume a video image can be divided into a plurality of image blocks, with each image block can have one or more pixels. The process 10 can estimate a predicted motion vector for each image block. The process 10 can include the following steps:

Step 100: Start.

Step 102: Calculate a pixel difference value corresponding to a current frame and a reference frame for each pixel of the image block.

Step 104: Determine a pixel difference area according to the pixel difference values corresponding to the plurality of pixels.

Step 106: Determine a predicted motion vector according to the pixel difference area.

Step 108: End.

According to the process 10, a predicted motion vector of the image block corresponding to the current frame is estimated according to the reference frame. Firstly, in Step 102, pixel difference values corresponding to the current frame and the reference frame are calculated for each pixel in the image block. In more detail, a current pixel value corresponding to the current frame and a reference pixel value corresponding to the reference frame may be first detected for each pixel. Next, the detected current pixel value and the reference pixel value are subtracted to generate a difference value between the two values. In such a case, the result is taken as the pixel difference value of the corresponding pixel. Each of the current pixel value and the reference pixel value may be a brightness value or a chroma value, and the corresponding pixel difference value may be a brightness difference value or a chroma difference value. As such, the pixel difference value of each pixel may represent a degree of variation between the current frame and the reference frame.

Preferably, the reference frame is a previous frame. In other words, the reference frame may be a single image frame (or a set of multiple image frames) preceding the current frame in the video image. For instance, if the current frame is an image frame at time T(n), then the reference frame may be a previous frame (e.g., an image frame at time T(n−1)). As such, the pixel difference value calculated in Step 102 for each pixel is the difference between the corresponding pixel values in the current frame and in its previous frame. Notably, the reference frame is not limited to being the most-recent previous frame, but may also be an image frame from several frame periods before the current frame, e.g. an image frame at time T(n−3). This should be readily understood to one skilled in the art, and is not further described here. Additionally, the reference frame may also be a collection of several previous frames. For example, the reference frame may be a collection of the previous three frames (i.e. image frames at time T(n−1) to T(n−3)); correspondingly, in Step 102, a difference between the current pixel value of the current frame and an average pixel value of the collection of reference frames (e.g. previous three frames) may be calculated for each pixel. In other words, the current pixel value of the current frame and the reference pixel value corresponding to the previous frames are detected, respectively, and then the average pixel value of the frames in the reference frames is calculated. Next, the current pixel value and the average reference pixel value are subtracted to generate the pixel difference value of the current frame and the previous frames.

Furthermore, since a video image is formed from a series of consecutive image frames, neighboring image frames would exhibit a strong spatial and temporal correlation due to their proximity in occurrence time points. As a result, when an object remains stationary in a video, neighboring frames usually do not exhibit any significant variation; namely, the current pixel value of the current frame and the reference pixel value would be the same or very similar. Similarly, if an object is moving in the video, there would be a significant variation between the current pixel value corresponding to the current frame and the reference pixel value corresponding to the reference frame for all pixels along a moving edge of the object. In other words, when the object is moving, corresponding pixels along its moving edge would have larger pixel difference values. In such a case, it is possible to determine a pixel difference area in Step 104 according to the calculated pixel difference value, after all pixel difference values have been calculated in the image block. In more detail, in Step 104, pixel difference values corresponding to each pixel may be compared with a variation threshold value to generate a comparison result. Pixels having pixel difference values greater than the variation threshold value are selected to form the pixel difference area according to the comparison result. As such, the pixel difference area represents a region along which the edge of the object has moved between the current frame and the reference frame.

Figure 2A:
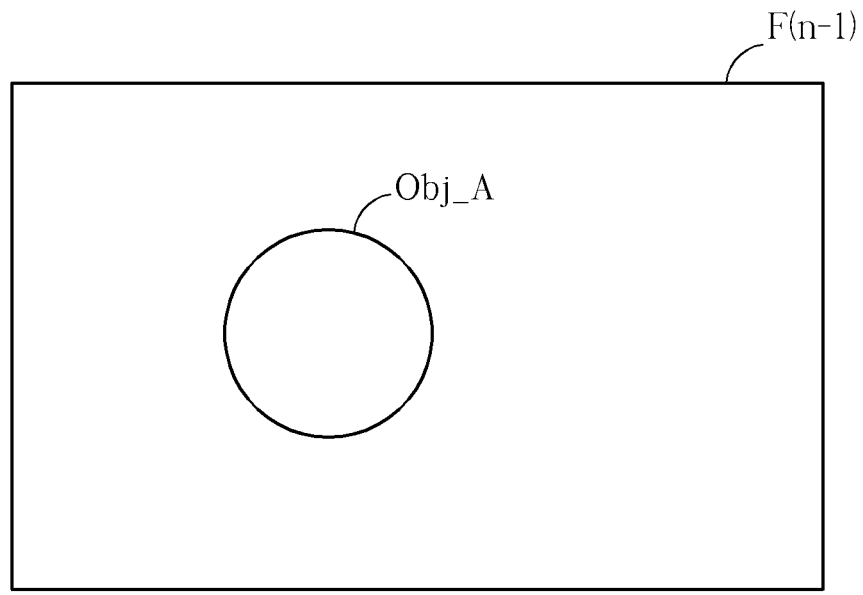
FIGS. 2A and 2B are schematic diagrams of an object moving in a video image.
Figure 2B:
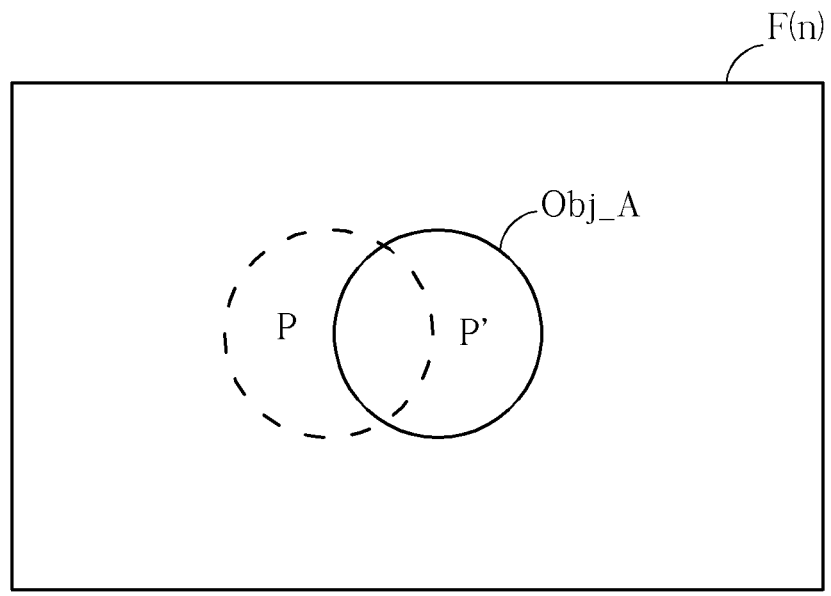
Figure 3:
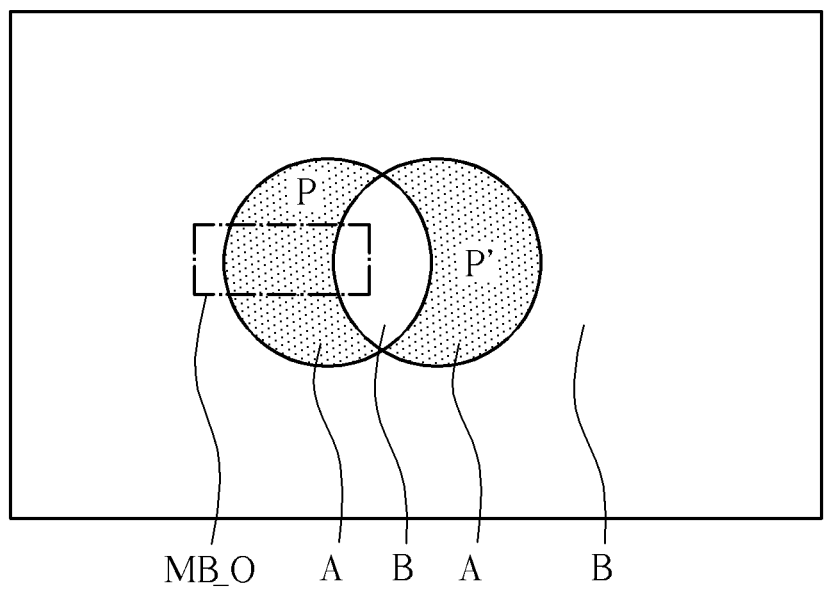
FIG. 3 is a schematic diagram of a distribution of pixel difference values when an object is moving in a video image.
Figure 4:
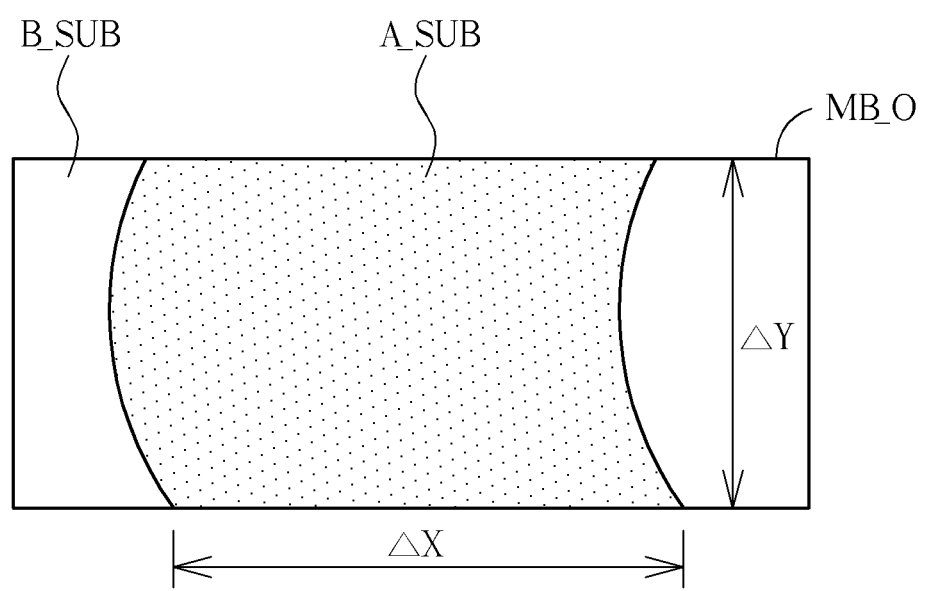
FIG. 4 is a schematic diagram of an image block shown in FIG. 3.

For example, please refer to FIGS. 2A and 2B, which are exemplary schematic diagrams of an object moving in the video image. Assume that image frames F(n−1) and F(n) are frames occurring at time T(n−1) and time T(n) in the video image, respectively. For illustration purposes, suppose only a single object is moving in the video image (i.e. object Obj_A), and the image frames F(n−1) and F(n) are taken as the reference frame and the current frame, respectively. As shown in FIGS. 2A and 2B, the object Obj_A is at a position P in the image frame F(n−1) and the object Obj_A is at a position P' in the image frame F(n). In other words, the object Obj_A has moved from the position P to the position P'. Generally, pixels along the moving edge of the object Obj_A would have greater pixel difference values. On the other hand, pixels for displaying the object Obj_A (pixels within the object Obj_A) in both of the image frames F(n−1), F(n), as well as pixels not for displaying the object Obj_A in either of the image frames F(n−1), F(n) (i.e. background pixels outside the object Obj_A) have zero or extremely low pixel difference values, for there is no variation in displaying. Please refer to FIGS. 3 and 4, which are exemplary schematic diagrams of a distribution of the pixel difference values when the object Obj_A is moving in the video image. FIG. 4 is a schematic diagram of an image block MB O shown in FIG. 3. Assume that pixels along a moving path of an edge of the object Obj_A have pixel difference values greater than a variation threshold value, and all pixels within the object Obj_A, as well as background pixels, in the image frames F(n−1), F(n) have pixel difference values of zero. In other words, after subtracting the brightness values (or chroma values) of the image frame F(n−1) from the brightness values (or chroma values) of the image frame F(n), the distribution of the pixel difference values in the video image would be as shown in FIG. 3. Referring to FIG. 3, the pixel difference area A (shaded area) represents a region formed by pixels having pixel difference values greater than the variation threshold value, and the blank region B represents a region where pixel difference values are zero. Therefore, as shown in FIG. 4, when estimating a predicted motion vector for a single image block (e.g. the image block MB_O), it is possible to first obtain pixel difference values for all of the pixels in the image block MB_O via Step 102, and then determine the pixel difference area A_SUB and the blank region B_SUB via Step 104.

Next, in Step 106, a predicted motion vector corresponding to the image block is determined according to the information in the pixel difference area obtained from the previous steps. For example, the predicted motion vector of the image block may be determined according to a horizontal length or vertical length of the pixel difference area. In other words, a horizontal component of the predicted motion vector may be decided according to the horizontal length of the pixel difference area, or a vertical component of the predicted motion vector may be decided according to the vertical length of the pixel difference area. For example, please continue to refer to FIG. 4. Assuming that a width of the pixel difference area A_SUB is $\Delta X$, then the horizontal component of the predicted motion vector V corresponding to the image block MB_O may be set as $\Delta X$; if a height of the pixel difference area A_SUB is $\Delta Y$, then the vertical component of the predicted motion vector V corresponding to the image block MB_O may be set as $\Delta Y$. Alternatively, the predicted motion vector V of the image block MB_O may be set as V=($\Delta X$, $\Delta Y$) or V=($\Delta X$, 0) or V=(0, $\Delta Y$). Note that, the height is used here as an example, whereas in reality the pixel difference area A_SUB may be split into a positive region and a negative region, and both the vertical component and the horizontal component may also be either positive or negative. Furthermore, when the image frame is too complex beyond recognition, both positive and negative regions may be used. Additionally, smaller areas or irregular areas may be filtered out when determining the pixel difference area A_SUB.

Figure 5:
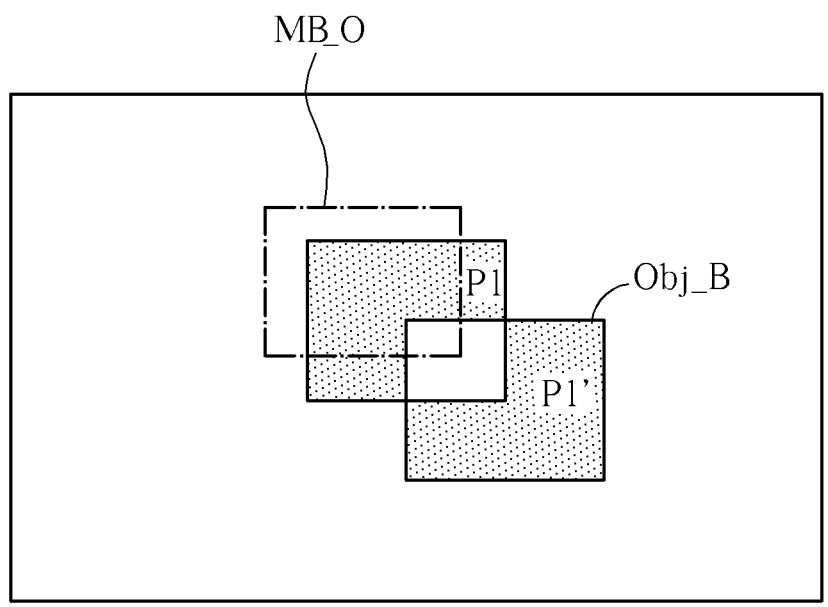
FIG. 5 is a schematic diagram of a distribution of pixel difference values when another object is moving in the video image.
Figure 6:
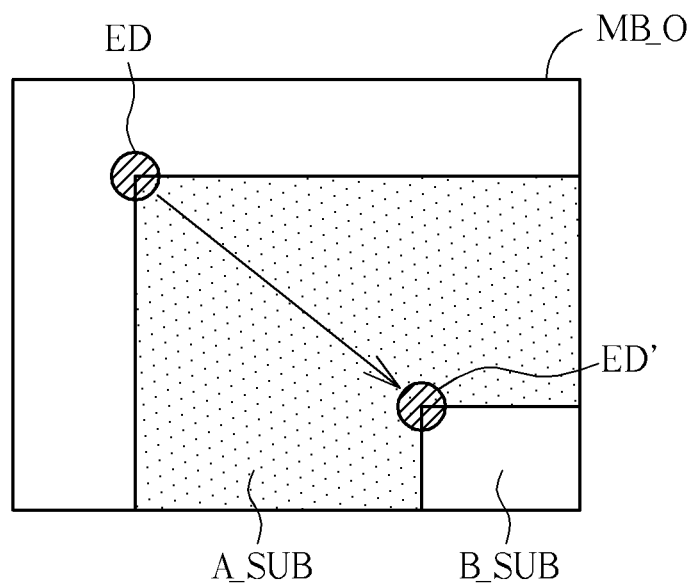
FIG. 6 is a schematic diagram of an image block shown in FIG. 5.

Moreover, since the pixel difference area is formed by pixels along the moving edge of the object in the video image, there is usually a strong spatial correlation between a shape of the pixel difference area and the object. In such a case, in Step 106, it is also possible to estimate the motion vector of the image block according to the correlation between the shape of the pixel difference area and the object. For example, when the movement of the object is not too great, an edge in the pixel difference area and an edge of the object would exhibit a similarity in shape, and thus it is possible to determine the predicted motion vector according to the correlation between edges of the pixel difference area and the object. Please refer to FIGS. 5 and 6, FIG. 5 is a schematic diagram of the distribution of pixel difference values for an object Obj_B moving in the video image. FIG. 6 is a schematic diagram of an image block MB_O shown in FIG. 5. Assume FIG. 5 is a schematic diagram of pixel difference distribution of the two image frames after performing pixel value subtraction, and there is only a single moving object in the video image (i.e. the object Obj_B). For illustration purposes, the pixel difference area A (shaded area) and the blank region B are selected according to the same criteria as shown in FIG. 3, and not reiterated here. As shown in FIGS. 5 and 6, after the object Obj_B moves from position P1 to position P1', it can be easily seen from the shapes of the pixel difference area A_SUB and the object Obj_B that the object Obj_B is moving from a position ED towards a direction of a position ED'. Therefore, it can be estimated that a direction of the predicted motion vector is the direction from the position ED to the position ED'. Alternatively, the vector formed by the position ED and the position ED' may be set as the predicted motion vector V of the image block MB_O. In other words, it is possible to estimate an object's moving trend or direction via detecting the variation in transition distribution of two objects.

On the other hand, the aforementioned estimated predicted motion vector can also be applied to a motion estimation procedure, to provide a reference for various motion vector search algorithms, and to further improve search accuracy and search time for motion vectors. For example, a predicted motion vector estimated by an embodiment of the invention may serve as a search reference for a 3D recursive search, to greatly reduce search time and improve search accuracy for motion vectors.

In summary, the above-mentioned embodiments of predicted motion vector estimation method are performed via detecting a distribution of pixel difference values of different image frames. Thus, search time can be reduced without requiring frequency domain conversion, thereby greatly reducing computation time and allowing faster and more accurate predicted motion vector estimation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An estimation method of a predicted motion vector for an image block having one or more pixels, the estimation method comprising:
    calculating a pixel difference value corresponding to a current frame and a reference frame which is generated based on at least one frame preceding to the current frame, for each pixel of the image block;
    determining a pixel difference area corresponding to the current frame and the reference frame according to the pixel difference values corresponding to the plurality of pixels; and
    determining a predicted motion vector of the image block according to the pixel difference area corresponding to the current frame and the reference frame, wherein the step of determining the predicted motion vector of the image block comprises:
        determining at least one of a horizontal component and a vertical component of the predicted motion vector, according to at least one of a horizontal length and a vertical length of the pixel difference area.

2. The estimation method of claim 1, wherein the step of calculating the pixel difference value corresponding to the current frame and the reference frame for each pixel of the image block comprises:
    detecting a current pixel value corresponding to the current frame and a reference pixel value corresponding to the reference frame for each pixel of the image block; and
    calculating a difference value between the current pixel value and the reference pixel value as the pixel difference value.

3. The estimation method of claim 2, wherein each of the current pixel value and the reference pixel value is a brightness value, and the pixel difference value is a brightness difference value.

4. The estimation method of claim 2, wherein each of the current pixel value and the reference pixel value is a chroma value, and the pixel difference value is a chroma difference value.

5. The estimation method of claim 1, wherein the step of determining the pixel difference area corresponding to the current frame and the reference frame according to the pixel difference values corresponding to the plurality of pixels comprises:
    comparing the pixel difference value of each pixel with a variation threshold value to generate a comparison result; and
    selecting pixels having pixel difference values greater than the variation threshold value to form the pixel difference area corresponding to the current frame and the reference frame according to the comparison result.

6. The estimation method of claim 1, wherein the step of determining the predicted motion vector according to the pixel difference area corresponding to the current frame and the reference frame comprises determining a direction of the predicted motion vector according to a correlation between a shape of the pixel difference area and an object.

7. The estimation method of claim 6, wherein the step of determining the predicted motion vector according to the pixel difference area corresponding to the current frame and the reference frame comprises determining the direction of the predicted motion vector according to a correlation between the shape of the pixel difference area and an edge of the object.

8. The estimation method of claim 1, wherein the reference frame is a previous frame.

* * * * *